March 1, 1960 R. L. PETRITZ ET AL 2,927,267
SIGNAL MONITORING CIRCUIT
Filed April 22, 1957
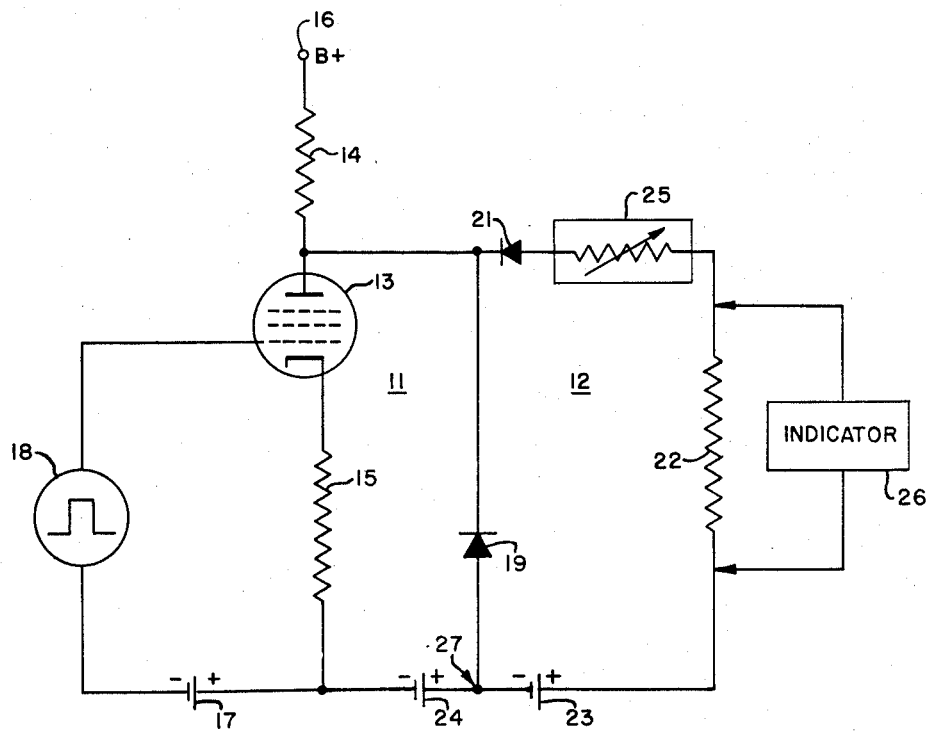
INVENTORS.
R. L. PETRITZ
O. P. MANLEY
J. O. VARELA
BY
ATTYS United States Patent Office 2,927,267
Patented Mar. 1, 1960

2,927,267

SIGNAL MONITORING CIRCUIT

Richard L. Petritz, Washington, D.C., Oscar P. Manley, Cambridge, Mass., and James O. Varela, Kensington, Md., assignors to the United States of America as represented by the Secretary of the Navy Application April 22, 1957, Serial No. 654,430

13 Claims. (Cl. 324—57)

(Granted under Title 35, U.S. Code (1952), sec. 266)

The invention described herein may be manufactured and used by or for the Government of the United States of America for governmental purposes without the payment of any royalties thereon or therefor.

This invention relates generally to electrical monitoring circuits, and more particularly to an intermittent signal monitoring circuit utilizing electronic gating circuitry for affecting a periodic sampling of variations occuring in intelligence signals of minuscule energy levels.

Although numerous signal monitoring systems employing switching circuitry have been heretofore devised utilizing vacuum or crystal diode elements, which circuits have, in general, performed satisfactorily, these circuits have not been found to perform entirely satisfactorily in applications involving the monitoring of signal variations resulting in 0.1 microampere changes in currents at a level of 100 microamperes. More specifically, the sampling intervals of the prior art switching circuits utilizing crystal or junction diodes has been found at low current levels to be limited by the comparatively large current transients occurring when the diodes are switched from their forward to reverse bias operating conditions. This limitation has been determined as resulting from a hole-storage effect occurring in the junction diode during switching periods as well as the fact that many of the prior art circuits are operated at fairly high impedance levels which are conducive to the development of stray capacitances. Moreover, since the signal current level is only slightly above the inherent noise level of the junction diodes, a high degree of measurement accuracy is not readily obtainable. In like manner, the prior art switching circuits utilizing vacuum diodes have not been found entirely satisfactory for the reason that a poor degree of reproducibility of the low level signal current during successive switching operations occurs. Additionally, in both vacuum and crystal diode prior art switching circuits inherent parametric variations of the circuitry, such for example, as resulting from ambient temperature variations and tube drift, have resulted in fluctuations and instability in the operating level of the circuit during successive switching operations, thereby decreasing the accuracy of the measurements made upon the signal.

Accordingly, a principal object of the present invention is to provide a new and improved low level gating circuit.

Another object of the instant invention is the provision of a new and improved low energy level signal monitoring system.

Still another object of the present invention is the provision of a new ind improved electronic switching and clamping circuit.

A further object of the instant invention is to provide a monitoring system for sequentially indicating changes in a monitored signal with a large degree of accuracy.

A still further object of the present invention is the provision of a new and improved circuit for accurately indicating minute instantaneous changes in a varying resistivity element.

Another still further object of the present invention is to provide a new and improved photo-intensity indicating and measuring system.

Other objects and many of the attendant advantages of this invention will be readily appreciated as the same becomes better understood by reference to the following detailed description when considered in connection with the accompanying drawing wherein the solitary figure is a schematic wiring diagram of the monitoring circuit according to the instant invention. As shown thereon, the circuit includes a gate circuit, and a gated circuit, generally indicated by reference numerals 11 and 12, respectively. The gate circuit 11 includes an electron tube 13, such for example, as a 6AS6 pentode, serially connected through plate resistor 14 and cathode bias resistor 15 across a suitable operating potential source 16. The tube is normally maintained in a non-conductive state by means of a suitable bias potential, such for example, as may be provided by battery 17. A pulse generator 18 of selective pulse repetition rate is provided for rendering the vacuum tube 13 intermittently conductive at a preselected cyclic rate, such for example, as 1000 c.p.s.

The gated circuit 12 consists of "shorting" and "switching" diodes 19 and 21, respectively, an output resistance 22, biasing and reference potential energy sources 23 and 24, respectively, and a variable high impedance element, or signal transducer 25, which may be, by way of example and not limitation, a photoresponsive lead sulfide cell. The combined potentials of batteries 23 and 24 are selected so as not to exceed that of the B+ source 16 thereby to normally maintain the diodes 19 and 21 in a non-conductive state. Inasmuch as semiconductor diodes 19 and 21 act as an open circuit when biased in the reverse direction, no current flow exists in the gated circuit when the tube 13 is in a cut-off condition. Upon the application of a positive impulse from pulse generator 18 to the control grid of electron discharge device 13, the tube will be rendered conductive and, by suitable selection of the magnitude of plate resistor 14 and battery 24, the potential of the plate thereof will tend to become less than the potential of battery 24 whereupon both diodes 19 and 21 will be rendered conductive. In response to this occurrence, bias or load, battery 23 will affect a current flow through resistor 22 and device 25 which will be proportional to the instantaneous resistances thereof. To eliminate the possibility of resistance variation in device 25 due to heating by the load current passing therethrough, the potential magnitude of battery 23 is selected to cause a low level current flow, of for example, a magnitude of approximately 100 microamperes. Inasmuch as the varying element 25 is serially connected to fixed resistor 22 across energy source 23, any resistance variation therein will affect a corresponding potential change across resistor 22. It has been empirically determined that an 0.1% variation in a high impedance device 25 of approximately 1 megohm can be accurately indicated by a potential indicator 26, such as an oscilloscope or a voltmeter, shunted across fixed resistance 22 if the magnitude of resistance 22 is substantially less than the resistance of device 25. Experimental data indicate that the relationship of the resistive value of resistance 22 to transducer device 25 should be $R_{22} \cong 0.05 R_{25}$ in order to result in the most accurate measurements. Moreover, it will be apparent to one skilled in the art that if varying resistance element 25 is a photoconductive device the resistance of which is directly related to the light intensity impinging thereon, such for example, as a lead sulfide cell, the magnitude of the impinging radiant energy may be accurately measured by suitable calibration of indicator, or display, apparatus 26. In addition, it has been empirically determined that the primary function of diode 19 to act as a "switch" can be greatly improved by employing a diode having a back resistance very large as compared with the resistance of element 25, such for example, as a silicon semiconductor diode, thereby minimizing the potential drop across element 25 when the gated circuit is in an "off" or non-conducting condition. Additionally, if the circuit according to the present invention is to be included in a multichannel monitoring system, the possibility of "crosstalk" is substantially eliminated.

The gated circuit 12 will be rendered alternatively conductive and non-conductive at a periodic sequential rate corresponding to the preselected pulse repetition rate of pulse generator 18. To insure consistent repetitive operation of gated circuit 12 in response to successive actuations thereof by gate circuit 11, semiconductor diode 19 in cooperation with battery 24 operate as a clamp circuit 27. In other words, the potential of battery 24 serves as a reference for establishing the potential level of the plate electrode of tube 13 at which diode 21 will be biased in its forward direction and rendered conductive. The clamp circuit, in effect, makes the gated circuit substantially independent of any parametric variations in gate circuit 11 when the "gate" is in the "on," or conducting, condition, such for example as may result from component aging, ambient temperature variations, tube drift, supply potential changes, and the like.

Obviously many modifications and variations of the present invention are possible in the light of the above teachings. It is therefore to be understood that within the scope of the appended claims the invention may be practiced otherwise than as specifically described.

What is claimed as new and desired to be secured by Letters Patent of the United States is:

1. A circuit for indicating the variations of a varying resistance element comprising, in combination, normally non-conductive first circuit means including the varying resistance element and a constant impedance having a potential thereacross proportional to the resistance variations of said element during intervals when said circuit means is conductive, normally deactivated unidirectional conducting means coupled across said first circuit means for normally maintaining said circuit means non-conductive and being effective upon activation thereof for rendering said circuit means conductive, second circuit means for periodically developing a potential signal for rendering said unidirectional conductive means activated, normally ineffective unidirectional conductive circuit means effective in response to said potential signal for controlling the time and magnitude of response of said unidirectional conductive means to said potential signal by providing a uniform amplitude level to said potential signal, and means for indicating the potential across said constant impedance.

2. A circuit for sequentially indicating the variations of a varying impedance element comprising, in combination, normally non-conductive first circuit means including the varying impedance element serially connected to a constant impedance across which a potential representative of the impedance variations of said element is developed upon said circuit being rendered conductive, normally deactivated unilateral conducting means connected across said circuit means for normally maintaining said circuit means non-conductive and in response to activation thereof for rendering said circuit means conductive, second circuit means for producing a potential signal in response to which said unilateral conducting means is activated, signal generating means for effecting the production of said potential signal at a preselected sequential rate, means effective in response to said potential signal for impressing a constant unidirectional reference potential across said second circuit means thereby regulating the time and level of activation of said unilateral conducting means by said potential signal, and means for indicating the potential across said constant impedance.

3. A monitoring system for periodically indicating variations of a varying resistance element comprising, in combination, a first series circuit including the varying resistance element, a fixed resistance, a first unidirectional conductive device, and a first unidirectional potential energy source, said source normally biasing said device in a backward direction thereby to maintain said series circuit ineffective; a second circuit including a second unidirectional conductive device commonly connected in both said circuits and a second unidirectional potential energy source for normally biasing said second device in a backward direction thereby to aid said biased first device in maintaining said first series circuit ineffective; normally non-conductive circuit means for developing a potential impulse upon being rendered conductive, said impulse being adapted to bias said first and second unidirectional conductive devices in a forward direction and thereby to render said first series circuit effective, signal generating means for rendering said circuit means conductive at a preselected periodic rate, and means for indicating the potential existing across said fixed resistance when said first series circuit is rendered effective.

4. A monitoring system according to claim 3 wherein said first and second unidirectional conductive devices are semiconductor diodes, respectively.

5. A monitoring system according to claim 3 wherein said first unidirectional conductive device is of the silicon diode type.

6. A monitoring system according to claim 3 wherein said second unidirectional conductive device is of the germanium diode type.

7. A monitoring system according to claim 3 wherein said normally non-conductive circuit means includes an electron discharge device, and a potential energy source operatively connected thereto for normally maintaining said device biased beyond cut-off.

8. A monitoring system according to claim 3 wherein said signal generating means comprises an impulse generator having a preselected impulse repetition rate.

9. A monitoring system according to claim 3 wherein said indicating means comprises an oscillograph.

10. A monitoring system according to claim 9 wherein said oscillograph comprises a cathode ray oscilloscope.

11. A monitoring system according to claim 3 wherein said indicating means comprises a voltmeter.

12. A stable test circuit for indicating the instantaneous parametric fluctuations of an impedance under test comprising, in combination, periodically conductive electrical circuit means including an electron discharge device and a terminal of varying potential level occurring during the conductive periods thereof, a normally non-conductive branch circuit connected in the electron discharge path of said device and including said impedance with measuring means for indicating the magnitude of current flowing through said impedance during conduction of said branch circuit, the indicated magnitude of current being representative of the parametric fluctuations of said impedance, and a normally non-conductive clamp circuit means connected across said branch circuit adapted to be rendered conductive during said conductive periods, said clamp circuit means being connected with said terminal of varying potential level to establish thereat a predetermined constant potential level at which said branch circuit periodically becomes conductive.

13. A monitoring system for indicating the changes in a varying resistance load comprising circuit means for selectively developing a series of output potential signals, a first branch circuit coupled to said circuit means and including the varying resistance load, a fixed resistor, a first unidirectional electrical energy source, and a normally ineffective first unidirectionally conductive device adapted to being rendered effective in response to each of said series of output signals thereby to cause a current flow through the varying resistance load having a magnitude proportional to the instantaneous resistance of the load, a second branch circuit coupled to said circuit means at the juncture of the first unidirectionally conductive device and said circuit means and including a second unidirectional electrical energy source and a normally ineffective second unidirectionally conductive device adapted to being rendered effective in response to each of said series of output signals thereby to provide a uniformity in the response of said first unidirectionally conductive device to each of said series of output signals, and means responsive to the magnitude of current flow through said fixed resistor for indicating the variations in the load.

References Cited in the file of this patent

UNITED STATES PATENTS

| | | |
|---|---|---|
| 2,409,419 | Christaldi | Oct. 15, 1946 |
| 2,531,145 | Marco et al. | Nov. 21, 1950 |
| 2,618,753 | Van Mierlo | Nov. 18, 1952 |
| 2,651,753 | Buyer | Sept. 8, 1953 |
| 2,718,599 | Carpenter | Sept. 20, 1955 |
| 2,782,307 | Von Sivers et al. | Feb. 19, 1957 |